April 29, 1958  E. W. SPEARS, JR  2,832,528
ALCOHOL MIST ICING PREVENTION
Filed Oct. 1, 1953  3 Sheets-Sheet 1
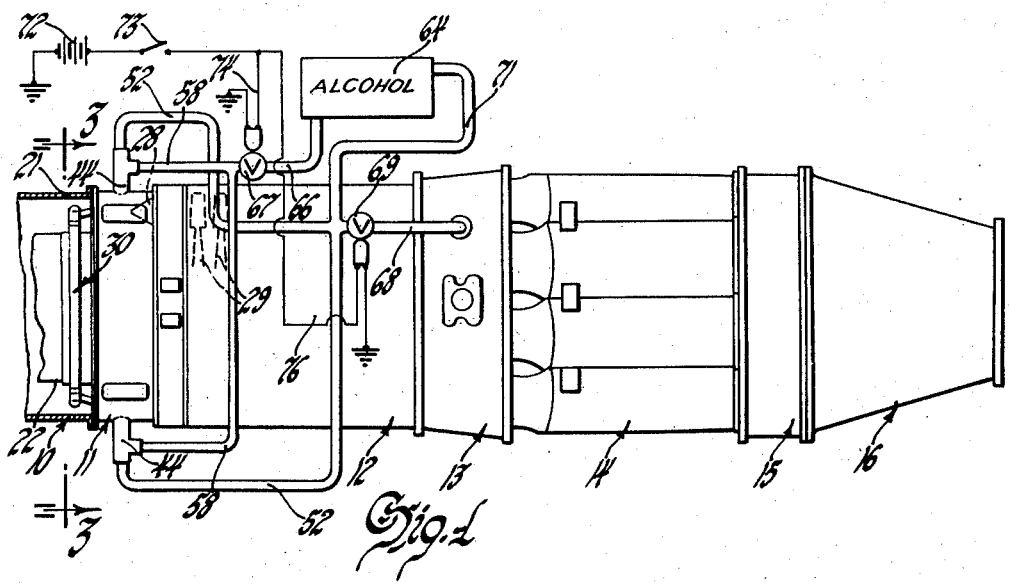
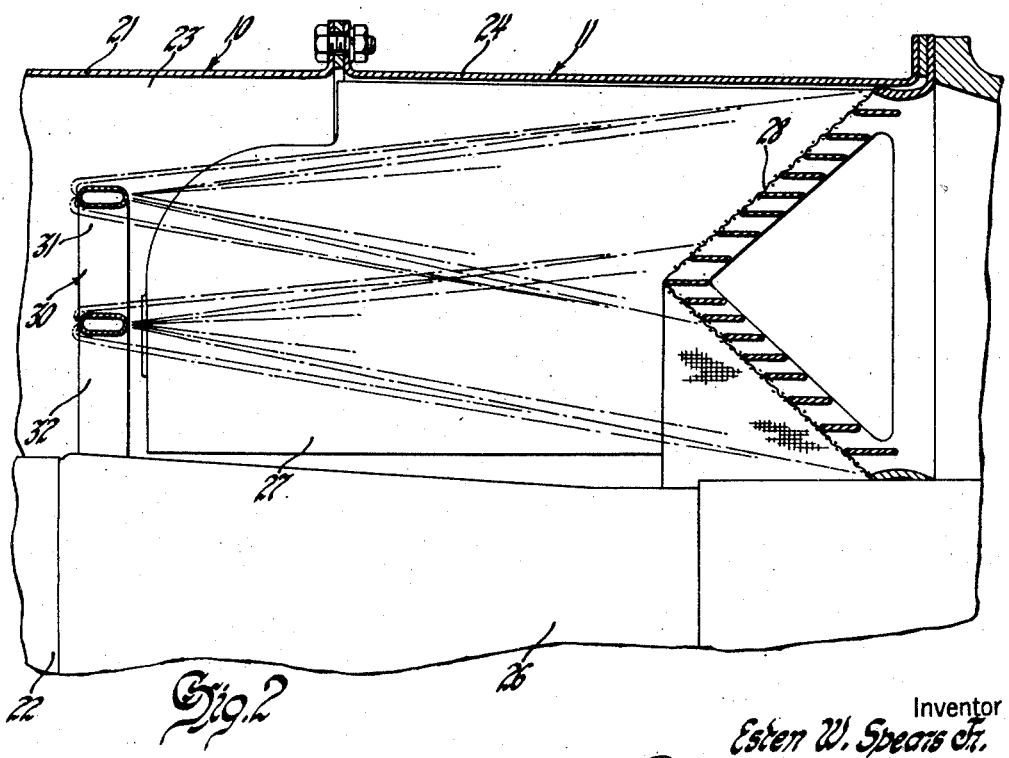
Inventor
Esten W. Spears Jr.
By Paul Fitzpatrick
Attorney

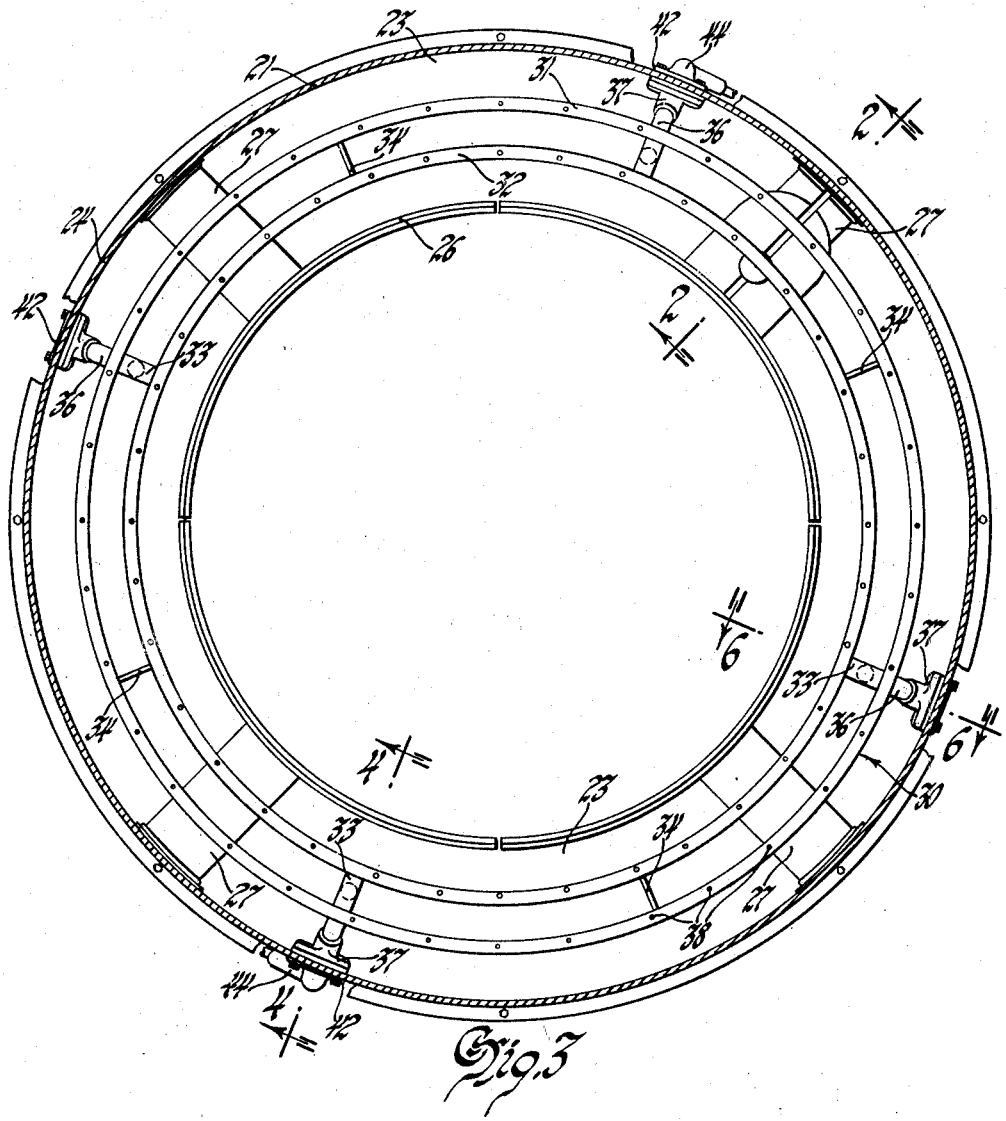

April 29, 1958 E. W. SPEARS, JR 2,832,528
ALCOHOL MIST ICING PREVENTION
Filed Oct. 1, 1953 3 Sheets-Sheet 3

Inventor
Esten W. Spears Jr.
By Paul Fitzpatrick
Attorney

United States Patent Office 2,832,528
Patented Apr. 29, 1958

2,832,528

ALCOHOL MIST ICING PREVENTION

Esten W. Spears, Jr., Indianapolis, Ind., assignor to General Motors Corporation, Detroit, Mich., a corporation of Delaware Application October 1, 1953, Serial No. 383,598

11 Claims. (Cl. 230—132)

My invention relates to the protection of air inlets of engines against deposition of ice therein. The problem is important in aircraft engines and most troublesome in the case of engines of the gas turbine type.

Under suitable atmospheric conditions, ice will be rapidly deposited on structures in the air inlet of a gas turbine engine, and, if allowed to build up, the ice will clog the inlet so as to disable the engine. One approach to the prevention of casualties of this sort has been to heat the structures on which ice may be expected to form. Because of the great volume of air flowing into such engines and the large area involved, heating is quite difficult and the provision of heating equipment adds very considerably to the weight of the engine.

My invention is directed to preventing ice deposition or removing ice already deposited by delivering a mist of an anti-freeze agent such as an alcohol into the air inlet so that the agent will be deposited on surfaces on which ice may form. Since the quantity of alcohol required for such a purpose is rather small, a feature of the invention lies in the use of compressed air as a carrier for the alcohol so that it may feasibly be distributed where it is needed.

The principal objects of the invention are to protect aircraft engines against formation of ice and to provide a simple, reliable, light weight and practical method and apparatus for achieving this result.

The nature of the invention and of the preferred embodiment of method and means for practice thereof and the advantages thereof will be more clearly understood by reference to the succeeding detailed description and the accompanying drawings in which:

Fig. 1 is an elevation view of a typical aircraft jet engine with a schematic diagram of the anti-icing system of the invention;

Fig. 2 is a partial sectional view of the air inlet duct of the engine taken on a plane containing the axis of the engine as indicated in Fig. 3;

Fig. 3 is a transverse sectional view of the air inlet taken on the plane indicated in Fig. 1;

Figure 4:
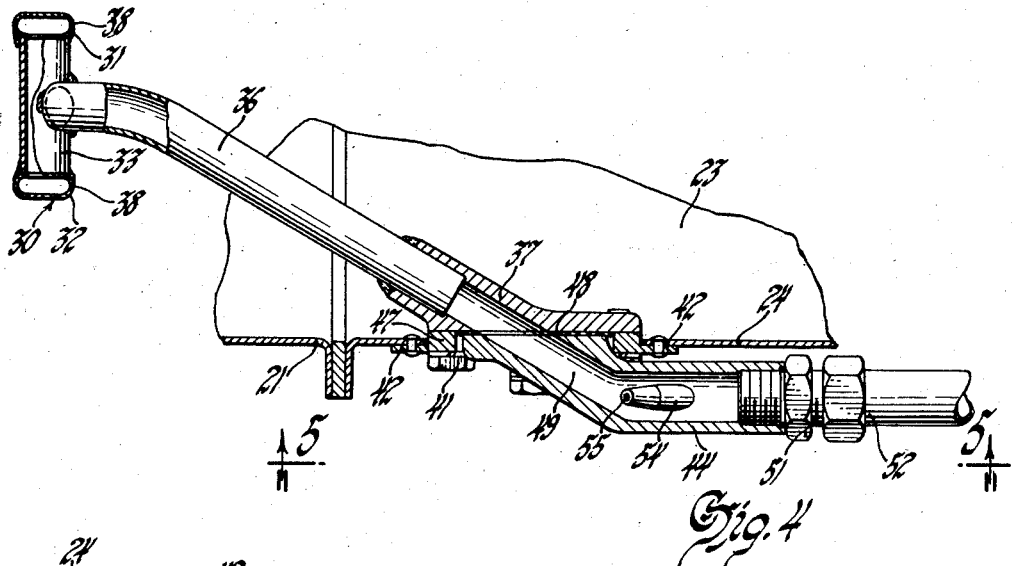
Fig. 4 is a partial sectional view taken on a plane containing the axis of the engine as indicated in Fig. 3.

In Fig. 1 is illustrated a known type of aircraft jet engine, which may be regarded as typical of such engines, and will be described only briefly, since the structure of the engine is generally understood and the details thereof are immaterial to the invention. The engine comprises an air intake duct 10, a compressor inlet 11, a compressor 12, a compressor outlet section 13, a combustion apparatus 14, a turbine 15, and an exhaust duct 16. The inlet duct 10 comprises an outer shell or casing 21 and an inner shell 22 which define between them an annular duct 23. The shells 21 and 22 are connected to the inner and outer shells 24 and 26 of the compressor air inlet 11 which define a continuation of the air inlet duct 23. Struts 27 extend across the duct 23 between the shells 24 and 26. Annular screens 28 composed of sections extending between the struts (Fig. 2) serve to protect the compressor blading against large foreign bodies.

The compressor may be of the usual axial flow type including blading 29 (Fig. 1). The compressor discharges through the diffuser or midframe 13 into the combustion chambers 14 which discharge combustion products through the turbine 15 and exhaust nozzle 16, the turbine driving the compressor.

Experience has been shown that crippling deposition of ice may occur on structures in or adjacent to the engine inlet which project into the air stream or, in general, affect the flow of air, such as the screens 28 and the fixed blading of the compressor in the first stage or two. Ice may also deposit on the struts 27, but these are widely spaced and this is not so serious. The screens 28 may be omitted, with consequent loss of protection for the engine, or may be made retractable, but this does not prevent obstruction of the inlet, since the ice forms on the compressor vanes.

Figure 5:
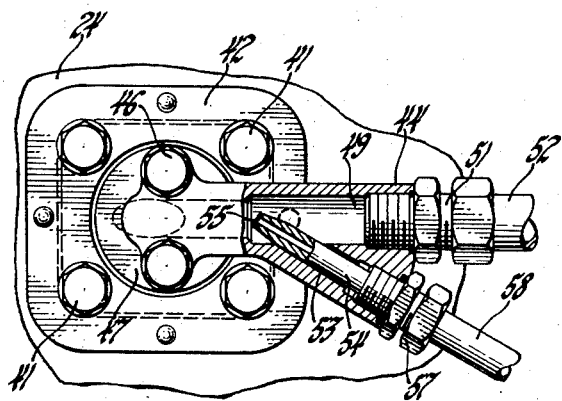
Fig. 5 is a view of the inlet fitting taken on the plane indicated in Fig. 4, with parts in section.
Figure 6:
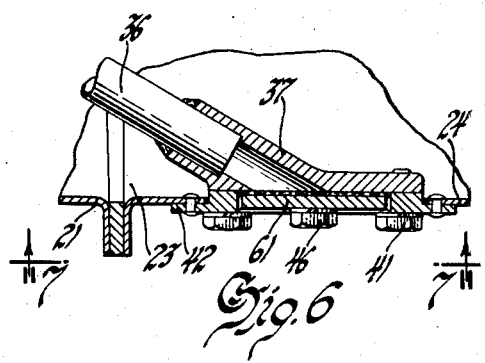
Fig. 6 is a detail sectional view illustrating a manifold support taken on the plane indicated in Fig. 3.
Figure 7:
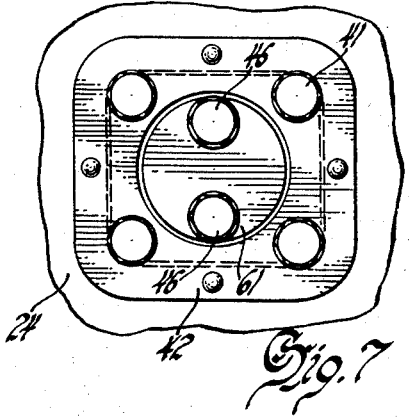
Fig. 7 is an external view of the same taken on the plane indicated in Fig. 6.

In accordance with the preferred embodiment of the present invention, the anti-icing manifold assembly 30 comprises two ring manifolds 31 and 32 in the air inlet radially spaced from each other and from the inner and outer walls of the duct as shown most clearly in Figs. 2 and 4. The manifolds are formed from tubing of a flattened or streamlined configuration to minimize interference with the air flow through the duct. The two manifolds are in communication with each other through four radial tubes 33 welded to the tubes 31 and 32 and are additionally connected by braces 34 intermediate the tubes 33. Each tube 33 is entered at the side by a tube 36 extending rearwardly and outwardly and fixed at its outer end to a flange or plate 37 mountable on the outer shell 24. The tubes 36 and flanges 37 constitute the support or mounts for the manifold assembly 30 and in addition two of the tubes 36 serve to conduct compressed air and the anti-freezing agent into the manifolds 31 and 32. Manifolds 31 and 32 have a large number of orifices 38 for discharge of the anti-icing medium from the forward edge of the manifolds. In a typical jet engine, about forty orifices are provided in each manifold and the orifices are about five hundredths of an inch in diameter. Referring now to Figs. 4 and 5, the flanges 37 are attached by cap screws 41 to pads 42 riveted or otherwise fixed to the shell 24. A mixing injector 44 is secured to each of two opposite flanges 37 by cap screws 46, the injector 44 having a flange 47 which seats within an opening in the pad 42 against the face of the flange 37, with a gasket 48 between them. The device 44 defines a compressed air conduit 49 aligned with the inlet pipe 36 and provided with conventional fittings 51 for attachment of a compressed air line 52. The fitting 44 also is bored to define a branch passage 53 entering the air passage 49 at an acute angle. An alcohol injector nozzle or discharge jet 54 is threaded into the passage 53 and provides a discharge orifice 55 for the alcohol within the duct 49 from which the alcohol is aspirated by and mixed with the air flowing through the duct 49. A conventional fitting 57 connects an alcohol pipe 58 to the jet 54. The inlet fittings 44, as illustrated, are located near the top and bottom of the engine. The two supports 36 extending to the side of the engine are mounted on pads 42 (Figs. 1, 6, and 7), which may be identical with the other pads 42, by cap screws 41. Instead of the inlet fitting 44 a closure disk 61 is mounted on the pad by cap screws 46 to close the end of the tube 36. It will be understood, of course, that the pads which serve for support only may be different from the others (as also the supports 36 may be different), but it is preferable to maintain the parts uniform. This not only reduces the number of distinct parts, but also makes it possible to supply the anti-freeze to the manifolds at any of or all of four points, since the fittings 44 may be mounted on any of the pads 42.

The means by which the compressed air and alcohol are supplied to the manifold 30 are illustrated in Fig. 1. The anti-freeze substance, which is preferably alcohol, is stored in a reservoir 64 from which the alcohol is fed through a line 66, a normally closed solenoid actuated valve 67, and branch pipes 58 to the aspirating fittings 44. Compressed air is taken from the discharge portion 13 of the compressor through line 68 and a normally closed solenoid operated valve 69. The valve 69 when open discharges the compressed air into lines 52 running to the fittings 44 and also into a branch pipe 71 to the reservoir 64, which establishes a pressure on the alcohol in reservoir 64 equal to that in the pipes 52. The valves 67 and 69 are opened concurrently by any suitable mechanism which, if desired, may be such as to respond automatically to the presence of icing conditions. Since the means by which the operation of the deicing system is initiated are immaterial to this invention, there is illustrated merely an energizing circuit for the solenoid valves comprising a battery 72, a normally open switch 73, and lines 74 and 76 extending to the valve solenoids, the circuits being completed through ground.

The operation of the system will presumably be clear from the foregoing but may be reviewed briefly. With the engine in normal operation, air under pressure is constantly available at the connection 68. When conditions conducive to icing are present or the onset of icing is perceived, the switch 73 is closed, either manually or by any automatic mechanism, opening the solenoid valves 67 and 69. Air flows under pressure through the lines 52 into the injectors 44 where it draws in through the lines 58 the alcohol from the reservoir 64. The dimensions of the orifices 55 are such as to secure the desired rate of flow of alcohol. The air, with the alcohol entrained in it, flows through connections 36, 33 into the manifolds 31 and 32 and is discharged through the orifices 38 into the rapidly flowing air stream in the duct 23. The resulting mist, or fog, of alcohol suspended in air is discharged through the orifices 38 into the air stream flowing through the duct 23, by which it is carried against the manifold assembly 30, the screens 28, the struts 27, and the structures within the compressor such as vanes and blades 29. These surfaces, which are susceptible to ice formation, are thus coated with a film of alcohol which inhibits ice formation and also acts to cause melting of any ice already deposited. It has been found by tests in a typical jet engine that a rather small quantity of alcohol is required to provide protection against icing. Very good results have been obtained with a flow rate of two gallons per minute of alcohol in an engine taking in approximately five thousand pounds of air per minute. It is important that the rate of flow of alcohol be as low as practicable to minimize the weight of the anti-freeze which must be carried.

Since the amount of alcohol to be supplied is small and the areas to be covered are large, the use of air to form a mist or fog with the alcohol, rather than spraying liquid alcohol directly from the manifold is of great importance. If liquid alcohol is sprayed, since a large number of spaced orifices are necessary to cover the large area of the intake, each orifice must be so small, if only the needed quantity of alcohol is injected, that the orifices readily clog and performance is uncertain. Increasing the size of the orifices to obviate clogging would result in intolerably large consumption of anti-freeze, since the pressure cannot be reduced below that necessary for atomization.

Reference has been made to the use of alcohol as the deicing medium, as alcohols such as ethanol and methanol are the presently preferred media. It will be understood, however, that the invention is not concerned with the selection of a suitable anti-freezing medium. The medium should be one which is liquid, will not freeze in the reservoir, and will not damage the engine, and preferably one which is combustible.

The addition of alcohol or the like in the mist form so as to be deposited on the surfaces of the engine which are subject to icing is to be distinguished from the injection of large quantities of alcohol-water mixture into the air intakes of jet engines for thrust augmentation. In such cases, a mixture of water and alcohol is sprayed at very high rates in liquid form into the engine intake, the primary effect being to cool the air in the compressor and the combustion products by the heat of vaporization of the liquid. In the method of this invention, the purpose is to provide a mist of alcohol in the inlet which is just sufficient to coat the surfaces, and the amount is very small by comparison to that used for thrust augmentation. Also, in the method of the present invention the alcohol is injected as an air and alcohol mist or suspension rather than as a spray of water and alcohol from a liquid-filled manifold.

It will be seen that the method and apparatus of the present invention eliminates heavy and complicated systems for direct heating of the intake and is of such nature that it is very easily installed in conventional gas turbine engine inlets.

The detailed description of the preferred embodiment of the invention for the purpose of explaining the principles thereof is not to be construed as limiting the invention, as modifications may be made by the exercise of skill in the art within the scope of the invention.

I claim:

1. A method of protecting engine air intakes and the like having surfaces on which ice may be deposited against accumulation of ice thereon comprising forming a suspension of an anti-freeze agent in gas under pressure substantially above that of the air flowing through the intake and discharging the suspension into the air flowing through the intake so as to deposit the anti-freeze agent on the said surfaces.

2. A method of protecting engine air intakes and the like having surfaces on which ice may be deposited against accumulation of ice thereon comprising forming a suspension of an anti-freeze agent in gas under pressure substantially above that of the air flowing through the intake, conducting the suspension to discharge points distributed over the area of the intake, and discharging the suspension from the said discharge points into the air flowing through the intake so as to deposit the anti-freeze agent on the said surfaces.

3. An aircraft engine comprising, in combination means providing an air inlet to the engine and defining surfaces upon which ice may be deposited, a manifold located in the air inlet upstream of the said surfaces, and means connected to the manifold for introducing a suspension of a liquid anti-freeze agent in a gas under pressure substantially above that of the air flowing through the air inlet into the manifold, the manifold being provided with distributed orifices for discharge of the anti-freeze agent suspension into the air flowing through the inlet into the engine.

4. An engine as recited in claim 3 in which the orifices are in the upstream face of the manifold.

5. An aircraft engine comprising, in combination, means defining an annular air inlet, structures in the inlet providing a locus for the deposition of ice precipitated from the air flowing through the said inlet, a manifold mounted in the inlet and provided with a number of discharge orifices distributed over the circumference of the inlet, means for supporting the manifold from the first-mentioned means, means connected to the manifold for introducing compressed gas into the manifold, and means connected to the manifold actuated by the compressed gas flowing to the manifold for introducing a liquid antifreeze agent into the manifold and discharging the agent as a gas borne mist or spray through the said orifices.

6. An aircraft engine comprising, in combination, means defining an annular air inlet, structures in the inlet providing a locus for the deposition of ice precipitated from the air flowing through the said inlet, a manifold mounted in the inlet and provided with a number of discharge orifices distributed over the circumference of the inlet, means for supporting the manifold from the first-mentioned means, means connected to the manifold for introducing compressed gas into the manifold, and injector means connected to the manifold actuated by the compressed gas flowing to the manifold for introducing a liquid anti-freeze agent into the manifold for discharge as a mist or spray through the said orifices.

7. An aircraft engine comprising, in combination, means defining an annular air inlet, structures in the inlet providing a locus for the deposition of ice precipitated from the air flowing through the said inlet, a manifold mounted in the inlet and provided with a number of discharge orifices distributed over the circumference of the inlet, means for supporting the manifold from the first-mentioned means, and means connected to the manifold for introducing a suspension of an anti-freeze agent in compressed air into the manifold for discharge through the said orifices.

8. An aircraft gas turbine engine comprising inner and outer shells defining between the shells an annular air inlet to the engine, a tubular manifold extending around the annular inlet and spaced radially from the said shells, a plurality of supports extending from the said manifold to one of the said shells, at least one of the supports providing an inlet for fluid to the manifold, means connected to the said one support for supplying compressed gas to the manifold through the said one support, means connected to the manifold for forming a suspension of an anti-freezing liquid agent in the compressed gas in the manifold, the manifold being provided with apertures distributed over the cross section of the inlet for discharge of the compressed gas with the anti-freezing agent carried thereby to form a mist in the inlet.

9. An aircraft gas turbine engine comprising inner and outer shells defining between the shells an annular air inlet to the engine, a pair of streamlined tubular manifolds extending around the annular inlet and spaced radially from the said shells and from each other, a plurality of similar supports extending from the said manifolds to one of the said shells, at least one of the supports providing an inlet for fluid to the manifolds, means connected to the manifolds for supplying compressed gas to the manifolds, means connected to the manifolds for forming a suspension of an anti-freezing liquid agent in the compressed gas in the manifolds, the manifolds being provided with apertures distributed over the cross section of the inlet for discharge of the compressed gas with the anti-freezing agent carried thereby to form a mist in the inlet.

10. An aircraft gas turbine engine comprising inner and outer shells defining between the shells an annular air inlet to the engine, a pair of streamlined tubular manifolds extending around the annular inlet and spaced radially from the said shells and from each other, a plurality of supports extending from the said manifolds to one of the said shells, at least one of the supports providing an inlet for fluid to the manifolds, means in the engine for compressing air, means connected between the compressing means and the manifolds for conducting compressed air from the engine to the manifolds, means connected to the said one of the supports actuated by the compressed air for supplying an anti-freezing liquid agent through the said one of the said supports to the manifolds, the manifolds being provided with apertures distributed over the cross section of the inlet for discharge of the compressed air with the anti-freezing agent carried thereby to form a mist in the inlet.

11. An engine as recited in claim 10 in which the orifices are in the upstream face of the manifolds.

References Cited in the file of this patent

UNITED STATES PATENTS

| | | |
|---|---|---|
| 561,160 | DuFaur | June 2, 1896 |
| 2,097,926 | Kimball | Nov. 2, 1937 |
| 2,312,187 | Patterson | Feb. 24, 1943 |
| 2,390,093 | Garrison | Dec. 4, 1945 |
| 2,406,473 | Palmatier | Aug. 27, 1946 |
| 2,412,846 | Taylor | Dec. 17, 1946 |
| 2,457,031 | Campbell | Dec. 21, 1948 |
| 2,634,049 | Hodges et al. | Apr. 7, 1953 |

FOREIGN PATENTS

| | | |
|---|---|---|
| 531,299 | Great Britain | Jan. 1, 1941 |
| 667,981 | Great Britain | Mar. 12, 1952 |